United States Patent

[11] 3,550,950

| [72] | Inventor | Samuel C. Pollock<br>Rochester, Mich. |
|---|---|---|
| [21] | Appl. No. | 782,992 |
| [22] | Filed | Dec. 11, 1968 |
| [45] | Patented | Dec. 29, 1970 |
| [73] | Assignee | General Motors Corporation<br>Detroit, Mich.<br>a corporation of Delaware |

[54] VEHICLE BODY GUTTER ARRANGEMENT
2 Claims, 4 Drawing Figs.

[52] U.S. Cl. .................................................. 296/137
[51] Int. Cl. .................................................. B62d 25/06
[50] Field of Search ........................................... 296/28, 137

[56] References Cited
UNITED STATES PATENTS

| 2,369,579 | 2/1945 | Kobligk ........................ | 296/28 |
| 2,937,047 | 5/1960 | Hezler et al. ................... | 296/28 |
| 2,991,120 | 7/1961 | Barenyi ........................ | 296/137 |

FOREIGN PATENTS

| 511,210 | 8/1939 | Great Britain ................ | 296/28 |

Primary Examiner—Benjamin Hersh
Assistant Examiner—Leslie J. Paperner
Attorneys—W. E. Finken and Herbert Furman ABSTRACT: An automotive body roof panel has depressions extending along the front and sides to form rain gutters, and panel edge reinforcing strips overlie these depressed portions to substantially conceal them from view. Hollow sections of the body front corner pillars serve as downspouts for draining the gutters.

INVENTOR.
Samuel C. Pollock
BY
S.C. Thorpe
ATTORNEY

VEHICLE BODY GUTTER ARRANGEMENT

BACKGROUND OF THE INVENTION

The invention relates to automotive vehicle bodies and particularly to improvements in the means for collecting and draining off surface water from the vehicle roof during operation in inclement weather, etc. The conventional practice heretofore has been to provide an upturned and generally narrow arcuate-section strip along the side edges of the body roof. The prior U.S. Pat. No. 3,198,572 to Stolarczyk shows a gutter arrangement typical of such prior construction. U.S. Pat. No. 1,826,865 to Carr suggests means for supporting this general type of gutter along the sides and across the front end of a convertible top.

SUMMARY OF THE INVENTION

The principal object of my invention is to increase the capacity of such roof gutters, while at the same time, substantially concealing them from view. I accomplish this by forming the gutters as depressions in the roof panels, one along each side edge thereof, and providing each side edge of the panel with a strip member which overlies the adjacent depressed section. A relatively deep and wide gutter is thereby obtainable, and the stiffness of the roof is increased. Also, by shaping the overlying portion of the strip to complement the curvature of the undepressed area of the panel and applying the same surface treatment to both, these gutters are rendered practically unnoticeable as viewed from adjacent the vehicle. A similar depression and reinforcing strip may be provided along the front edge of the roof panel so as to interconnect the forward ends of the two side gutters, and openings may be arranged therein to connect with hollow portions of the two front corner pillars of the body for draining off the water from the roof. These and other objects and advantages of the invention will be apparent from the following description of one preferred form of the invention with reference to the drawing, wherein:

DESCRIPTION OF PREFERRED EMBODIMENT

Figure 1:
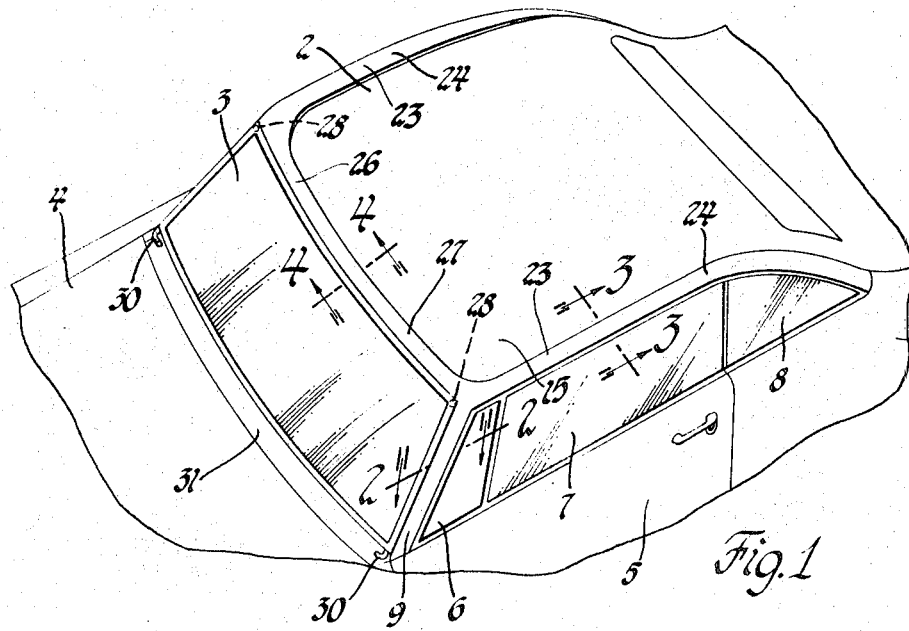
FIG. 1 is an overhead view in perspective of a portion of an automobile body including a roof with front and side gutters in accordance with the invention.
Figure 2:
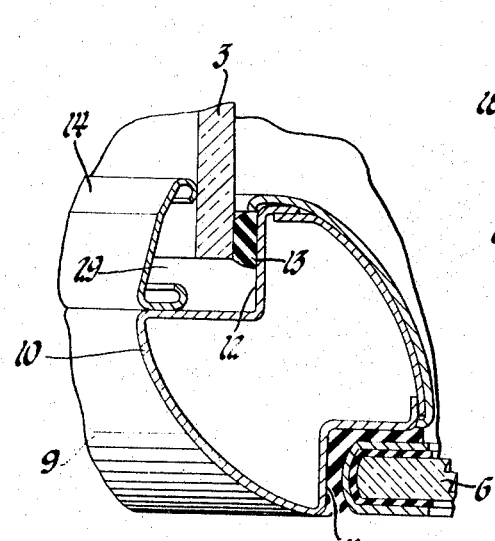
FIGS. 2, 3 and 4 are enlarged sectional views taken substantially along lines 2-2, 3-3, and 4-4, respectively, of FIG. 1.

Referring now to the drawing in detail, an automobile body 1 is shown in FIG. 1, including the roof 2, windshield 3, engine hood 4, door 5, and side windows 6, 7, and 8. At each side of the windshield is the usual front corner pillar 9 which, as best shown in FIG. 2, includes a load-supporting member 10 with oppositely disposed recesses 11 and 12 to receive the side window 6 and windshield 3, respectively. A suitable packing 13 between the front wall of the recess 12 and the windshield serves to prevent entry of air and water inwardly of the body at that point, and a generally C-shaped external molding 14 cooperates with the windshield and the recess 12 to provide a hollow section which is utilized uniquely in a manner to be later described.

Figure 3:
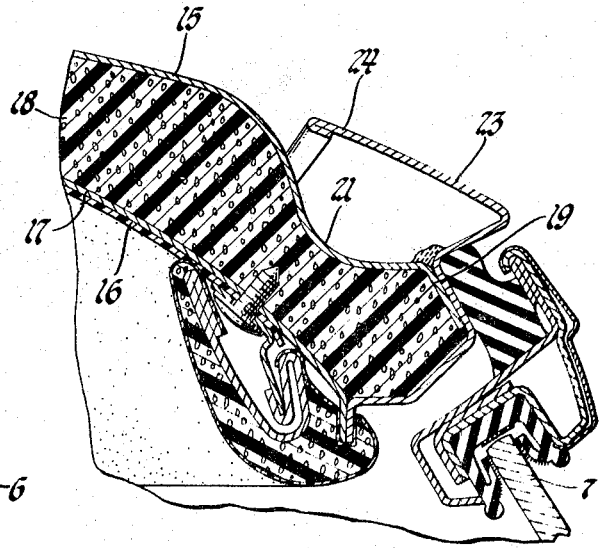
Figure 4:
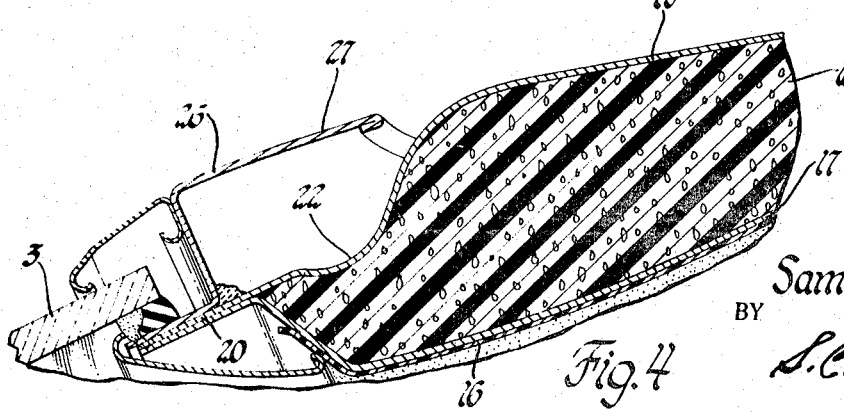

The roof proper, as best shown in FIGS. 3 and 4, comprises an outer panel 15 of sheet metal which extends from the windshield and transversely between the two sides of the body. Interiorly of the body below the roof panel is shown a head lining 16 which covers an inner panel 17 spaced from the outer roof panel 15, and between these two panels is a layer of insulating material 18. Adjacent each side edge 19 and its front edge 20, the outer panel 15 is provided with depressions 21 and 22 which serve as water-collecting gutters along the sides and front of the roof. Suitably secured as by welding or other means to the side edge 19 of the panel is a reinforcing sheet metal strip 23 having a laterally extending portion 24 which overlies the depression 21 and is shaped to complement the curvature of the main portion of the panel 15. Similarly, a reinforcing transverse strip 26 is secured to the front edge 20 of the panel and has a portion 27 overlying the depression 22 and substantially concealing the same.

The front depression 22 is joined at its ends with forward ends of the two side depressions 21, and the reinforcing strip portions 27 and 24 are suitably joined to present a continuous blended appearance above each corner pillar 9 of the body. An opening 28 (FIG. 1) is provided in each end of the front reinforcing strip 26 to communicate with the hollow section 29 (FIG. 2) formed between the recess 12, windshield 3 and molding 14. At the lower end of this hollow section is shown an outlet in the form of a connecting elbow 30 (FIG. 1) leading to a suitable water collecting chamber such as the conventional plenum chamber 31 extending transversely of vehicle below the windshield.

During the operation of vehicle in inclement weather, water thus flows off the roof into the gutterlike depressions 21 and 22 from which it is conducted via the opening 28 down through the hollow pillar section 29 from whence it is received and discharged by suitable passage means below the windshield. The arrangement described enables providing relatively deep and wide depressions in the roof outer panel, thereby substantially increasing the capacity of the gutters over that of conventional systems, without detracting from the external appearance of the vehicle. Such concealment of the depressions 21 and 22 can be made more complete by applying the same paint or other surface treatment on overlying portions 24 and 26 of the strips as is given the outer panel 15.

Various changes in the parts and their arrangement will readily suggest themselves to those skilled in the art, without departing from the spirit and scope of the invention as defined in the following claims:

I claim:

1. A vehicle body structure comprising, a roof panel, a front pillar joined to the roof panel at each side thereof, each of the pillars including a recessed portion receiving a side edge portion of a windshield and jointly forming a drain trough therewith, a side depression in the roof panel extending longitudinally of the body at each side of the roof panel to form side rain gutters, a front depression in the roof panel extending transverse of the body between the side depressions adjacent the front edge of the roof panel to form a front rain gutter in communication with the side rain gutters, a strip for each depression, each strip being supported by the roof panel adjacent a respective depression, each strip including a portion overlying the respective depression and providing a continuation of the adjacent roof panel contour and substantially concealing the respective depression, and means communicating the rain gutters and the drain troughs to thereby drain the gutters.

2. A vehicle body structure comprising, a roof panel, a front pillar joined to the roof panel at each side thereof, each of the pillars including a recessed portion receiving a side edge portion of a windshield and jointly forming a drain trough therewith, a side depression in the roof panel extending longitudinally of the body at each side of the roof panel to form side rain gutters, a strip for each depression, each strip being supported by the roof panel adjacent a respective depression, each strip including a portion overlying the respective depression and providing a continuation of the adjacent roof panel contour and substantially concealing the respective depression, and means communicating the rain gutters and the drain troughs to thereby drain the gutters.